March 11, 1924.
A. M. STANLEY
AUTOMOBILE WINCH
Filed April 3, 1919
1,486,845
3 Sheets-Sheet 1
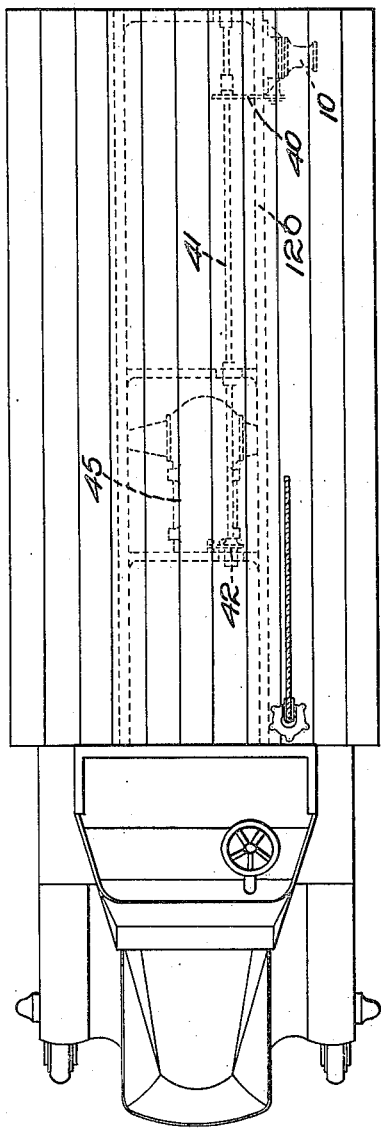
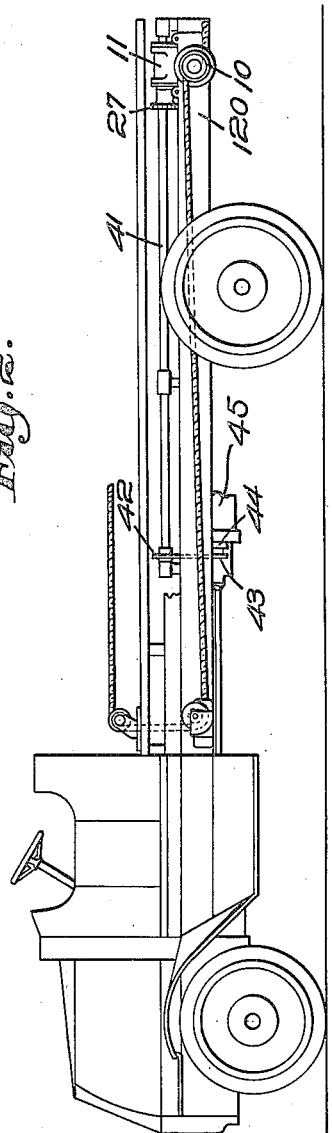

March 11, 1924.
A. M. STANLEY
AUTOMOBILE WINCH
Filed April 3, 1919  3 Sheets-Sheet 2
1,486,845
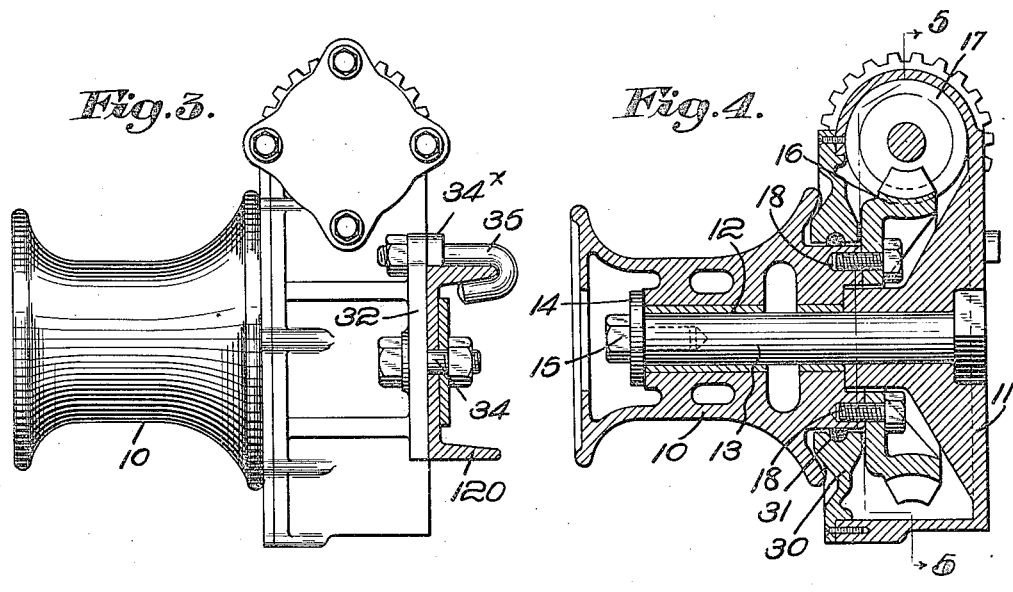
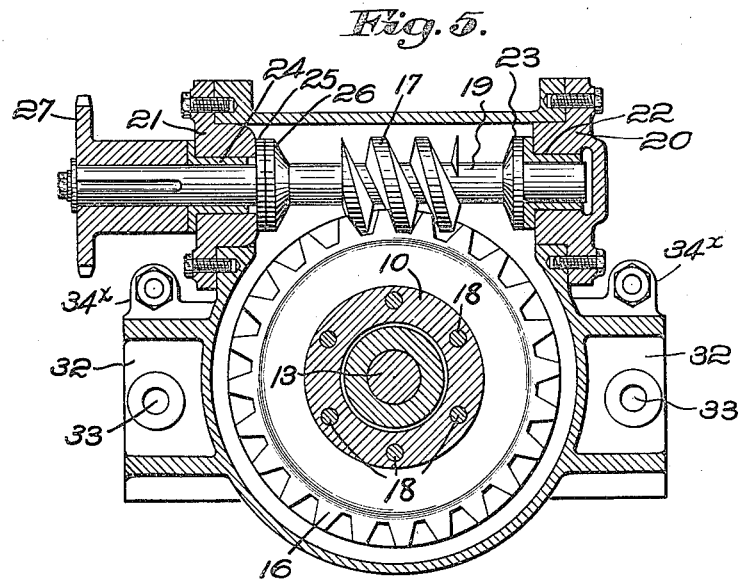

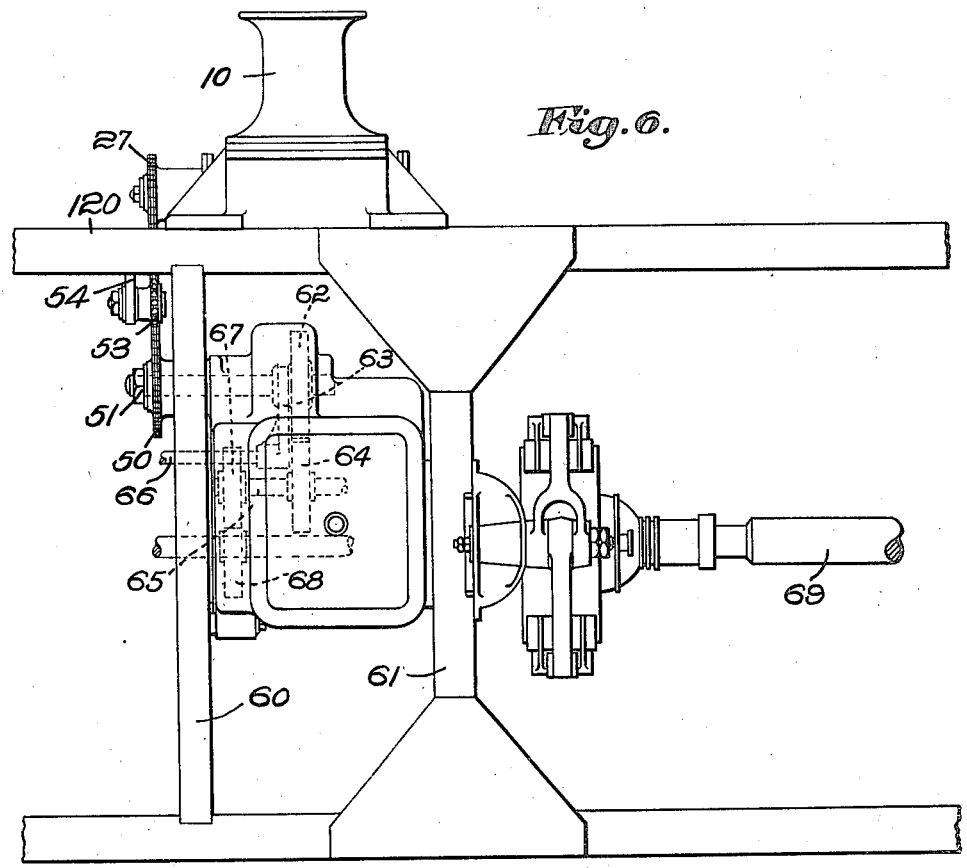
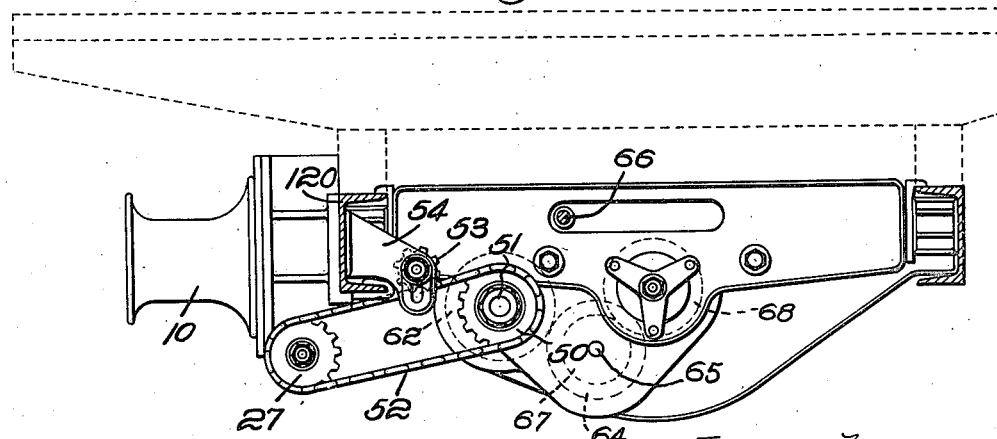

Patented Mar. 11, 1924.

1,486,845

UNITED STATES PATENT OFFICE.

ARTHUR M. STANLEY, OF LYNN, MASSACHUSETTS, ASSIGNOR TO MEAD-MORRISON MANUFACUTRING COMPANY, OF EAST BOSTON, MASSACHUSETTS, A CORPORATION OF MAINE.

AUTOMOBILE WINCH.

Application filed April 3, 1919. Serial No. 287,287.

*To all whom it may concern:*

Be it known that I, ARTHUR M. STANLEY, a citizen of the United States, and a resident of Lynn, in the county of Essex and Commonwealth of Massachusetts, have invented an Improvement in Automobile Winches, of which the following description, in connection with the accompanying drawings, is a specification, like characters on the drawings representing like parts.

This invention relates to automobile winches, being more particularly intended to provide a winch attachment which will be simple, efficient and adaptable to the varying requirements of automobile use.

The invention will be best understood by reference to the following description when taken in connection with the acompanying illustration of one specific embodiment thereof, while its scope will be more particularly pointed out in the appended claims.

In the drawings:

Fig. 1 is a plan view of an automobile truck equipped with a winch system embodying one form of the invention.

Fig. 2 is a side elevation of the truck shown in Fig. 1.

Fig. 3 is a detail in end elevation, partly in section, showing on a larger scale the self-contained winch attachment with driving gearing, illustarted in Figs. 1 and 2.

Fig. 4 is a central sectional elevation of the winch attachment shown in Fig. 3.

Fig. 5 is a sectional side elevation taken on the line 5—5 in Fig. 4.

Fig. 6 is a plan of a portion of an automobile truck showing another mode of applying the winch attachment illustrated in Figs. 3 to 5, and Fig. 7 is a sectional front elevation of the parts shown in Fig. 6.

Referring to the illustrative embodiment of the invention shown in the drawings and particularly to Figs. 3 to 5 inclusive, the winch head 10, of any suitable form or size, is carried by a supporting casing 11, which is adapted to be rigidly clamped to any suitable part such as the side frame member 120 of the chassis of the vehicle. Journal support for the winch head is provided by the bushing 12 carried upon the non-rotatable shaft 13 which latter is fixedly secured in the supporting casing 11. The winch head is held in position on the bushing by a washer 14 and screw 15, which latter is threaded into the end of the fixed shaft 13.

Self-contained within the casing, there is also provided transmission gearing for the winch consisting of non-reversible or self-locking gearing such as the worm gear 16 and the driving worm 17. Herein the worm gear is rigidly secured to the inner end of the winch head within the casing by means of bolts 18, which clamp the flanged face of the worm gear to the inner end or hub of the winch head.

The worm 17 is secured to or formed integrally with the driving shaft 19, which is journaled in the flanged bearing members 20 and 21, the latter removably bolted to the casing 11. The flanged bearing member 20 has the shouldered bushing 22, serving as a journal bearing for the end of the worm shaft, and also as a thrust bearing for the enlarged shoulder 23 on the shaft. The bearing member 21 is provided with the journal bushing 24 and the thrust collar 25, the latter engaging the enlarged shoulder 26 on the worm shaft. The worm shaft projects through the bearing member 21 and has at its outer end the driving sprocket wheel 27 through which driving connection may be had with any suitable power driven part on the automobile, such as a direct or indirect connection with a power take-off on the transmission gear of the automobile.

The outside of the casing is closed by the annular plate 30 (Fig. 4) bolted to the casing and encircling the hub of the winch head and preferably provided thereat with an annular groove in which is located an oil packing ring 31, which may be of felt, or any other suitable material adapted to prevent the escape of lubricating oil around the winch.

The casing is further provided endwise with extended flanges 32—32 adapted to lie against the side frame member 12 and perforated at 33 to receive the clamping bolts 34, by which the structure is clamped rigidly to the side frame member 12.

To provide additional rigidity, means, such as the lugs 34ˣ. may be provided through which pass the threaded, hooked members 35, adapted to hook into the upper (or lower) member of the channel iron and clamp the structure still more rigidly to the side frame.

With the described structure, the winch attachment is adaptable to varying conditions and requirements of use. It may be applied to the side frame in the relation shown in Fig. 3, or, if more convenient for connection to the power take-off, or for any other reason, it may be inverted and applied with the worm shaft at the bottom, as is shown in Figs. 6 and 7. Driving connection may be had with the sprocket in the relation shown in Fig. 5, or the end bearing members 20 and 21 may be removed and, together with the worm, replaced in reversed relation so that the sprocket is located on the opposite side to that represented in Fig. 5. With any of these adjustments or changes, however, the driving worm and worm gear may be suitably lubricated by lubricating oil contained within the casing, the escape of which is prevented by the oil packing 31.

Since the winch head with its clamping support, its worm gearing and journal bearings therefor are all self-contained within the structure, the attachment may be located at any point on the chassis and clamped thereto, and driving connection from the power take-off secured by any suitable connections. It therefore provides an underhung winch, normally out of the way and below and within the limits of the over-hanging body and which may be located at any convenient point on the side frame.

In Figs. 1 and 2, I have shown the application of the described winch attachment to an automobile truck where the winch attachment is clamped to the side member of the chassis near the rear end thereof. The sprocket wheel 27 is connected by a sprocket chain 40 with a jack shaft 41, journaled in suitable bearings carried by the frame, and provided at its opposite end with a sprocket wheel 42, and connected by a sprocket chain 43 with a power take-off member 44, connected with the transmission gearing, which latter is designated generally by the numeral 45. Any suitable form of power take-off may be employed whereby the power may be derived from the transmission gearing of the automobile and connected to or disconnected from the source of power at will.

The construction in Figs. 1 and 2 illustrates how the winch attachment may be connected to the power take-off at a point relatively remote therefrom. If attached to the chassis at a point adjacent to the power take-off, the driving sprocket 27 may be connected directly to a sprocket wheel on the power take-off shaft. Such a construction is shown in Figs. 6 and 7, where the winch attachment is clamped to the side frame member 12 (but in inverted position as already described) in such position that the sprocket wheel 27 is in line with the sprocket wheel 50 and the power take-off shaft 51. The sprocket chain 52 connects the sprocket wheel 50 with the sprocket wheel 27, being also engaged herein by the idle guiding sprocket wheel 53 carried by the supporting arm 54 on the frame. The power take-off shaft 51 may consist in an extension of the usual counter shaft in the transmission gearing 45, the latter being supported upon the transverse frame member 60—61 secured to the side frame members of the chassis. Preferably, some means is employed for connecting or disconnecting the winch from the power take-off shaft. Herein I have shown for that purpose a sliding gear 62, keyed to the take-off shaft within the transmission gearing casing, but slidable upon the shaft and adapted to be moved by means of the forked arm 63 so as to cause it to mesh with or be disengaged from the driving gear 64 on the countershaft 65 in the transmission casing. The forked arm 63 is connected to the sliding rod 66, which latter is connected to any suitable operating lever (not shown) at the driver's seat or other convenient location on the vehicle. The counter shaft 65 may be driven in the usual way through the gear 67 on the counter shaft, and the meshing gear 68 on the main drive shaft, these parts being of any usual or well-known construction common in transmission gears of this class. By this arrangement, the power take-off shaft and the winch may be driven either simultaneously with or independent of the propelling shaft 69 of the vehicle.

While I have herein shown and described for purposes of illustration one specific embodiment of the invention, it is to be understood that extensive deviations in construction and form and relative arrangement of parts may be made, without departing from the spirit thereof.

Claims:

1. A winch attachment adapted to be mounted on the frame of an automobile and comprising a reversible support, a winch head and reversible driving gearing therefor including a worm and worm gear supported by said support, flexible driving means for said worm; and means providing for the reversible attachment of said support to the automobile frame in either one of two positions, in one of which said winch head and its driving means are at a different height as compared with the other position.

2. A winch attachment for an automobile, comprising a winch head, a support, a driving member for said winch head carried by said support, the driving member being mounted in said support whereby it may be reversed if desired, means carried by the driving member and adapted to be connected to the power take-off, and means for attaching the support to the framework of the automobile.

3. A self-contained winch mechanism comprising a casing, a winch head presenting a cable-receiving portion exterior to the casing, a worm gear removably secured to the inner end of the winch head and located within the casing, said casing having a base and a fixed journalling supporting member projecting from the base co-axially with the gear and winch head and providing a journal support therefor, said casing being also formed to present an enclosed oil chamber within which the gear is adapted to turn, a worm in said chamber engaging the gear, a worm shaft having an end projecting from the casing, removable journal supports in opposite ends of the casing in which the shaft is journalled, said supports being reversible to reverse the position of the worm shaft, and a drive member on the projecting end of the shaft.

4. A winch comprising a casing, a winch head outside the casing, a worm gear secured to the winch head and located within the casing, a worm and worm shaft, the latter projecting from the casing, a driving member on the projecting end of the shaft and removable journal supports for the shaft adapted to be reversed in position to reverse the position of the driving member.

5. A winch comprising a casing presenting a closed chamber for the gearing, a winch head outside the casing, a worm gear secured to the winch head and located within the casing, a worm and worm shaft, said casing having openings to permit the assemblage of the worm and worm shaft therein, and removable journal members secured to the casing and closing the openings therein and providing journal support for the worm shaft.

6. A self-contained winch attachment for automobiles comprising a casing having a base, means for clamping the base to the outside of the side frame member of the automobile chassis, a winch head outside the casing and rotatable about an axis extending laterally from the chassis, driving gearing within the casing including a worm gear secured to the winch head and a driving worm, said casing being formed to present an enclosed oil chamber within which the gearing is adapted to turn, and said casing presenting a fixed journalling supporting member projecting from the base co-axially with the gear and winch head and providing a journal support therefor, a worm shaft extending through the casing lengthwise the chassis, a driving sprocket on the worm shaft, a flexible drive connection between the sprocket and a power take-off on the machine and removable journal supports on opposite ends of the casing in which the shaft may be journalled, said supports being interchangeable to reverse the position of the worm shaft and the driving sprocket thereon, and said casing being adapted to be attached in inverted position to the side member of said chassis to permit the connection to the power take-off to be located either above or below the side member of the chassis.

7. A self-contained winch attachment for automobiles comprising a casing, means for clamping the same to the side frame member of the chassis, a winch head extending laterally from the casing, worm driving gearing within the casing, a driving shaft having journal supports in the casing, said supports being interchangeable to reverse the relation of the driving shaft.

In testimony whereof, I have signed my name to this specification.

ARTHUR M. STANLEY.